United States Patent [19]

Harper

[11] Patent Number: 4,980,986
[45] Date of Patent: Jan. 1, 1991

[54] FISHING APPARATUS

[76] Inventor: Dennis E. Harper, 4390 Bowers Dr., Anoka, Minn. 55303

[21] Appl. No.: 158,341
[22] Filed: Feb. 22, 1988
[51] Int. Cl.⁵ ............................................. A01K 97/12
[52] U.S. Cl. ...................................................... 43/17
[58] Field of Search ................................. 43/17, 16, 4

[56] References Cited

U.S. PATENT DOCUMENTS

| D. 196,888 | 11/1963 | Pilsner | 43/17 |
|---|---|---|---|
| 2,502,231 | 3/1950 | Oberg | 43/17 |
| 2,618,091 | 11/1952 | Sheraski | 43/17 |
| 2,785,493 | 3/1957 | Thiel | 43/17 |
| 3,025,852 | 3/1962 | Quilling | 43/4 |
| 3,078,610 | 2/1963 | Howell | 43/17 |
| 3,134,186 | 5/1964 | Krueger | 43/4 |
| 3,170,458 | 2/1965 | Anderlie | 43/4 |
| 3,171,404 | 3/1965 | Skog | 43/4 |
| 3,230,655 | 1/1966 | Nomsen | 43/17 |
| 4,120,111 | 10/1978 | Young | 43/17 |
| 4,567,686 | 2/1986 | Akom | 43/17 |
| 4,621,446 | 11/1986 | Anderson | 43/17 |
| 4,787,166 | 11/1988 | Vogt | 43/17 |

Primary Examiner—Richard K. Seidel
Assistant Examiner—James Miner
Attorney, Agent, or Firm—Henry C. Kovar

[57] ABSTRACT

Fishing apparatus intended primarily for ice fishing has a housing, a windowed door on the housing, an angling aperture in a bottom of the housing, a reel inside the housing, a flagpole and an electric light on the outside of the housing, and discrete actuators for the flag and the light; the actuators are engaged by a spool of the reel as line is taken out by a fish, and the flagpole is released to pop up and/or the light is turned on. A transparent solar energy collecting panel is provided on one side and the top of housing enabling solar energy to be collected inside the housing, the housing keeps an ice fishing hole from freezing up.

24 Claims, 2 Drawing Sheets

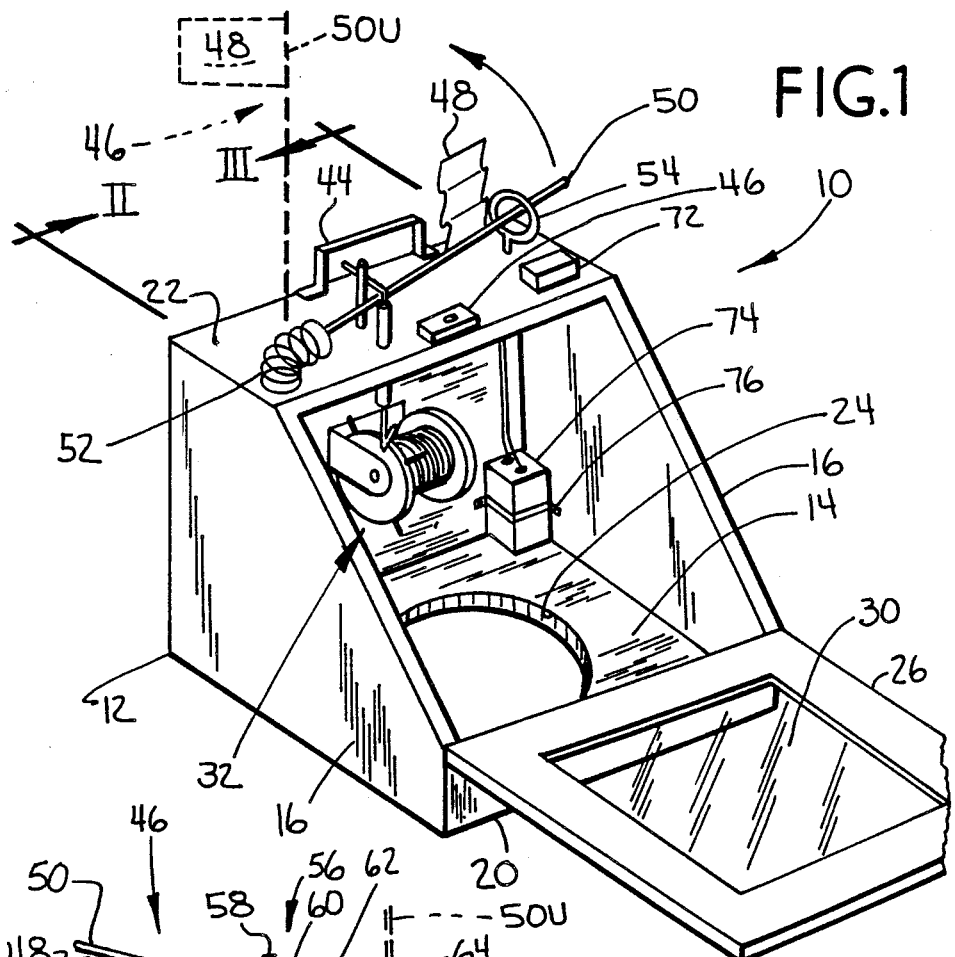
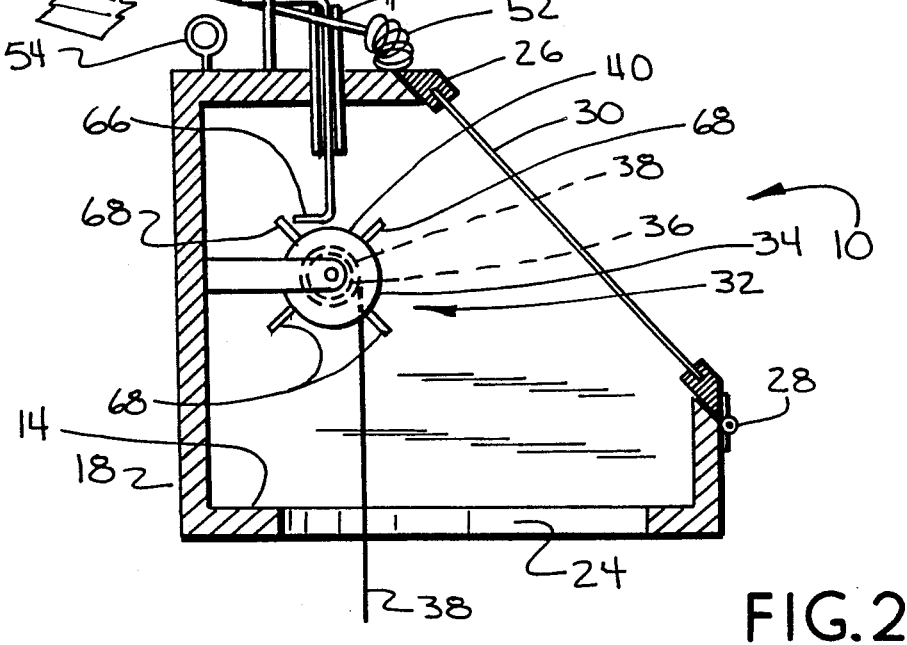

FISHING APPARATUS

BACKGROUND OF THE INVENTION

1. Field of the Invention

This invention pertains to a fishing apparatus having a housing enclosing a reel and having an indicator that a fish is engaged.

2. The Prior Art

No specific prior art is known, but ice fishing can be a tedious miserable experience when it's cold and the wind is blowing. A hole is usually drilled through the ice and a fish line dropped in. Typically the hole keeps freezing up, and the fishing line and bobber freeze into the newly formed ice. This effectively disables the fishing rig. It is also extremely uncomfortable to have to stand out in the open and keep an eye on your fishing rig; it's preferrable to retreat to a remote shelter.

OBJECTS OF THE INVENTION

It is an object of the present invention to provide an ice fishing apparatus that will prevent the fishing hole from freezing up.

It is an object of the present invention to provide an ice fishing apparatus that can utilize solar energy and/or chemical made heat for keeping an ice fishing hole open.

It is an object of the present invention to provide an ice fishing apparatus that a fish can be taken through.

It is an object of the present invention to provide a fishing apparatus having an enclosed reel, and an indicator for alerting a fisherman that a fish is engaged.

It is an object of the present invention to provide an ice fishing apparatus having an enclosed reel and actuators for external indication that a fish is engaged.

SUMMARY OF THE INVENTION

A fishing apparatus has a housing with a base and walls, an angling aperture through the base, a reel mounted to the base, a spool in the reel, an indicator which is visible from outside the housing and an actuator operable by the spool to make the indicator do something.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

BRIEF DESCRIPTION OF THE DRAWINGS

FIG. 1 is a perspective view looking down on the preferred embodiment of a fishing apparatus according to the present invention;

FIG. 2 is an elevational cross-sectional view through lines II—II;

DESCRIPTION OF THE PREFERRED EMBODIMENT

Figure 3:
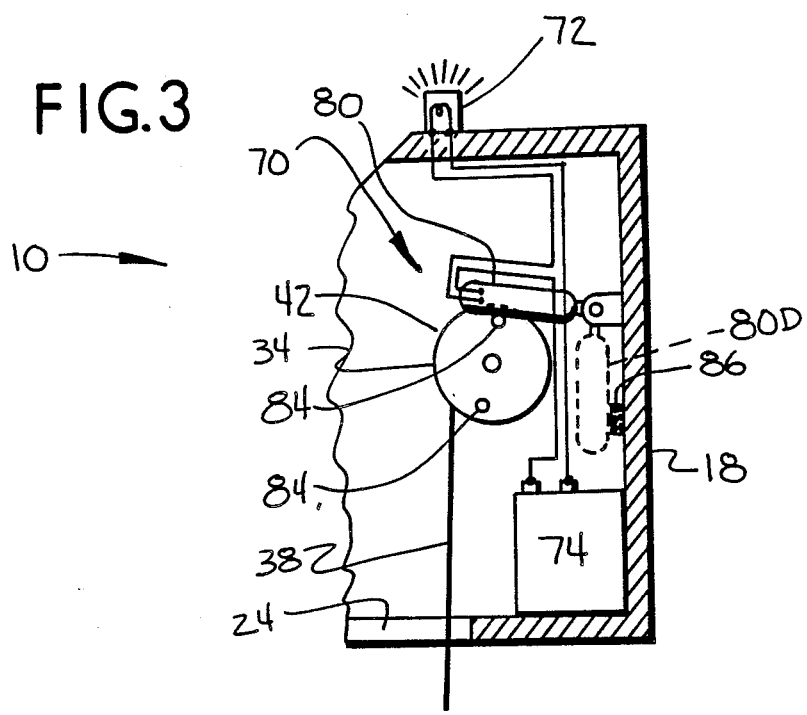
FIG. 3 is an elevational cross-sectional view through lines III—III.

In accordance with the principles of the present invention, the preferred embodiment of a fishing apparatus is shown in FIGS. 1-3 and generally indicated by the numeral 10.

The apparatus 10 has a housing 12 with a base 14, side walls 16, a rear wall 18, a front wall 20 and a top wall 22. The walls 16, 18, 20, 22 are all secured to and are above the base 14. The base 14 has a centrally located angling aperture 24 which is to be placed on the ice around and over a fishing hole through ice atop a body of water. On the front of the housing 12 is a normally closed door 26 having its lowermost horizontal edge secured to a hinge 28 on the housing 12, the door 26 has a window 30 that is substantially over the angling aperture 24 and which normally looks up as best shown in FIG. 2. The door 26 opens on the horizontal axis hinge 28 and rests upon the ice when open, as shown in FIG. 1.

A reel, generally indicated by the numeral 32 is mounted inside of and to the housing 12 where it is protected from the weather, and is preferrably mounted by an appropriate bracket 34 to the rear wall 18. The reel has a spool 34 having a central core 36 upon which the fishing line 38 is wound and stored. The spool preferrably has two end caps 40, 42 on each end of the core 36.

On top of the apperatus 10 is a handle 44 for easy carrying of the apparatus 10, and a lock 45 for locking the door 26 closed.

Indicators are provided to alert the fisherman that a fish is being engaged, i.e. is "on the hook". These indicators are visible on and from the outside of the housing 12.

The first indicator is generally indicated by the numeral 46 and is a very visible and relatively bright movable indicator 46 devised of a bright flag 48 mounted adjacent the distal end of a flagpole 50 movably mounted with respect to the housing 12. The flagpole 50 normally stands straight up (50U) and is mounted to the housing 12 by a coil spring 52 which is fastened to one of the walls 22. A fixed restrainer 54 is provided on one end of the top wall 22 and the distal end of the flagpole 50 is slipped into and restrained by the fixed restrainer 54 during storage, transit and non-use of the apparatus 10. When the distal end of the flagpole 50 is pulled out of the fixed restrainer 54, the flagpole 50 pops up to the normal elevated up or alert position 50U wherein the flag 48 is displayed and easily seen from long distances. In use, the flagpole 50 is normally restrained and held down by an actuator generally indicated by the numeral 56. This first actuator mechanism 56 has a fixed stop 58 extending upward off the top wall 22, and a movable member 60 which normally abuts against the fixed stop 58 to enclose and restrain the flagpole 50 in the normally down position shown in FIG. 2. The restraining member is the top leg of a generally U-shaped latch 62 which is pivotally mounted in and suspended by an eyelet 64 mounted in and extending through the top wall 22. The eyelet 64 is tubular solid element which extends competely up to the level of the release member 60. The outside of the eyelet 64 is spaced from the fixed stop 58 and forms a second fixed stop. In use the flagpole 50 is pulled out of the fixed restrainer 54 such as the eye screw shown in FIGS. 1 & 2 and placed down in between the fixed stop 58 and the eyelet 64. The release member 60 is then rotated over atop of the flagpole 50 in a normal inactivity mode. The release member 60 is generally perpendicular to the flagpole 50 restrained in between the fixed stop 58 and the eyelet 64. In use the wind will make the flagpole 50 flatten back and forth inside the fixed stop 58 and the eyelet 64 and the perpendicular release member 60 resists being sprung open by the active flagpole 50. The latch 62 has a lower leg forming a trip lever 66 which is discretely above the spool end cap 40. The end cap 40 has at least one and preferably a plurality of projection pins 68 which physically engage the trip lever 66 as the spool 34 is turned. A fish engaged on the line 38 will pull the line and cause the spool 34 to turn. As the spool 34 is turned, the projection 68 engage the trip lever 62 and turn it in the eyelet 64. The restaining member 60 is turned off of the flagpole 50 and the flagpole 50 is popped up to its normal position 50U by the coil spring 52 providing a visual alert and indicator that a fish has been engaged. This indication signal is particularly effective in daytime.

A second indicator mechanism generally indicated by the numeral 70 is provided for giving an alert signal in darkness with a light 72 visible from the outside of the housing. The light 72 is electrically connected to be illuminated by a battery 74 with a mounting nest inside of the housing 12. A second actuator mechanism generally indicated by the numeral 78 has a mercury switch 80 freely pivotally mounted on a horizontal axis hinge 82 on the rear wall 18. The mercury switch 80 normally hangs down in the alternate position shown in dotted lines and designated 80D; in this down position 80D a circuit is completed from the battery 74 to the light 72 for an illuminated alert indication or signal. When the apparatus 10 is set up utilizing the second indicator 70, the battery 74 is connected and the mercury switch 80 is lifted up, the spool 34 is turned to place an abutment peg 84 under the mercury switch 80. When the mercury switch 80 is so supported, the circuit to the light 72 is broken. When the spool 34 is turned by a fish, the peg 84 is turned out from under the switch 80 and the switch 80 falls down against a snubber 86 and the circuit to the light 72 is closed and the light 72 is illuminated providing a signal of engagement.

Figure 4:
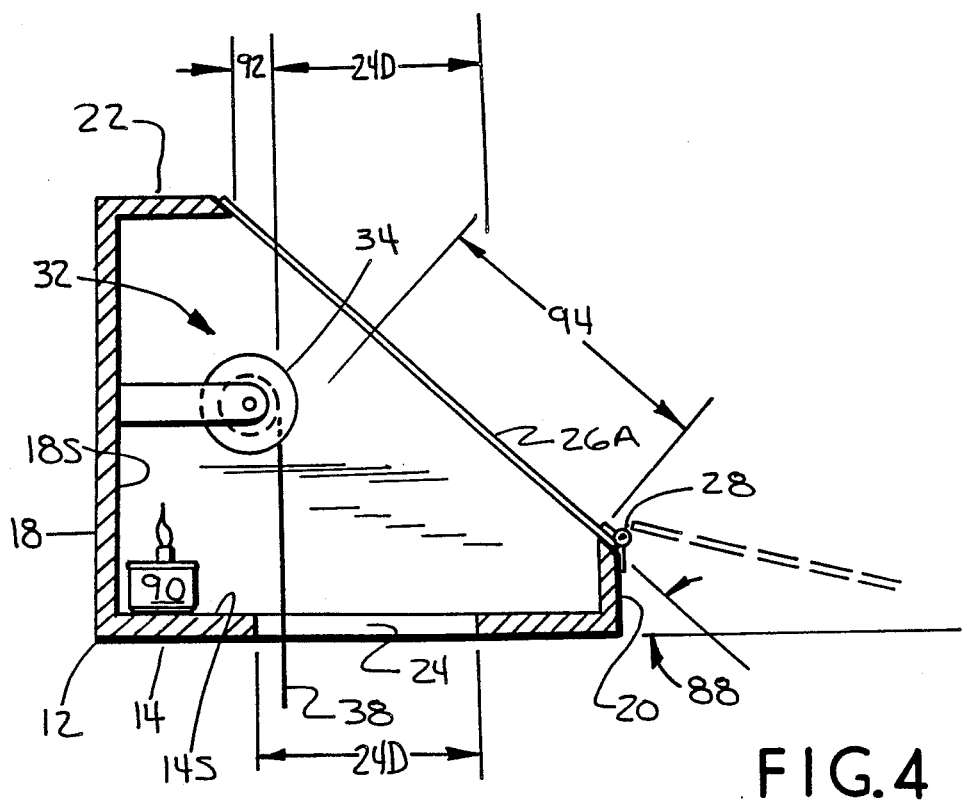
FIG. 4 is a cross-sectional elevation view of the apparatus of FIG. 1.

FIG. 4 illustrates some functionally advantagous geometric relationships in the apparatus 10. An alternate and completely transparent door 26A is shown.

Either door 26, 26A is preferably at an angle 88 of about forty-five degrees and should be at an angle which is in the range of thirty to sixty degrees above horizontal. The sun shines into the housing 12 through the door 26, 26A and against interior wall surfaces 14S, 16S, 18S which are blackened and have a surface for enhancing collection of solar thermal energy and solar heating of the inside of the apparatus 10. In the absence of sunlight, a chemical burner 90 may be placed inside the apparatus 10. The housing walls 14, 16, 18, 22 are airtight and have enough insulative value to retain enough heat in the housing 12 and/or prevent heat loss out of the housing 12 to prevent freeze-over of an ice fishing hole directly under the angling aperture 24. The alternate completely transparent door 26A also opens completely until its upper edge rests upon the ice and is co-planar with the base 14. The front wall 20 is relatively short and a minor (i.e. less than ½) fraction of the height of the back wall 18. The top wall 22 has a fore-aft dimension which is a minority fraction of the fore-aft depth of the base 14. The angling aperture 24 has a fore-aft depth 24D which is spaced forward of the rear wall 18 a distance greater than the fore-aft dimension of the top wall 22 so that there is an offset 92. The spool 34 has its core 36 generally directly above and/or just slightly forward of the rear edge of the angling aperture 24. When the door 26, 26A is opened, there is effected an access opening indicated by the numeral 94 giving discrete access to the spool 34, the line 38 and the angling aperture 24. The access aperture 94 is significantly larger than angling aperture depth 24D enabling a fish to be pulled firstly out the aperture 24, then past the spool 34 and over the front wall 20, and then through and out of the housing 12 without moving the housing. The transparent door 26A faces upward and forward for collection of solar heat and comprises a majority of the top distance and the height of one wall of the apparatus 10, the transparent door 26A essentially doubles as a solar panel. The housing 12 is opaque for collection of the solar energy, and the interior surfaces 14S, 16S, 18S are preferably flat black.

When the fisherman then engages the fish, the apparatus 10 remains in place and docs not need to be moved. The door 26, 26A is flipped open and the fisherman grabs the line and can then (if successful!) pull the fish up through the angling aperture 24 and through the housing 12 and out the access opening 94 defined by the housing 12 within the opened door 26, 26A.

The normally fully enclosed housing 12 and apparatus protects its operative components from snow, rain and cold, and effectively prevents the fishing hole in the ice from freezing up and keeps the reel 32, and actuators 56, 78 dry and operative. The fisherman can go keep himself or herself warm and cozy elsewhere.

Although other advantages may be found and realized and various modifications may be suggested by those versed in the art, it should be understood that I wish to embody within the scope of the patent warranted hereon, all such embodiments as reasonably and properly come within the scope of my contribution to the art.

I claim:

1. Fishing apparatus comprising
    (a) a housing having a base, upright walls secured to the base, and an angling aperture through the base;
    (b) a reel mounted to the housing, said reel having a rotatable spool with at least one rotation indicator thereon, said spool having means for storing a fishing line thereon;
    (c) indicator means visible from the outside of the housing, said indicator means having a normal mode and an alternate attention mode;
    (d) actuator means operatively connecting said rotation indicator to said indicator means and operative for changing said indicator means from the normal mode to the attention mode in response to rotation of the spool as fishing line is pulled off of said spool;
    (e) an access opening above said angling aperture; a normally closed door mounted on said housing and normally closing said access opening, said door being movable to an alternate access position enabling removal of a fish upward through the angling aperture, through the housing, and out of the access opening; and
    (f) a transparent window in said door and normally above said angling aperture.

2. The apparatus of claim 1, including a hinge mounting said door to said housing, and means for locking said door closed upon said housing.

3. The apparatus of claim 2, wherein a lowest edge of the door is secured to said hinge.

4. The apparatus of claim 1, in which said indicator means comprises a flagpole having means biasing it upward, and said actuator means includes a latch for holding the flagpole down while the spool is stationary.

5. The apparatus of claim 4, including second means for holding the flagpole down during transit of the apparatus.

6. The apparatus of claim 4, in which said latch is a generally U-shaped release lever pivotally mounted in said walls, said lever having a top restraining member normally over the flagpole, and a trip lever engagable with the spool.

7. The apparatus of claim 6 including at least one co-rotatable projection on the spool for engaging and moving the trip lever as the spool is turned.

8. The apparature of claim 7, wherein said trip lever is atop of said spool.

9. The apparatus of claim 6, including a fixed stop on the outside of said walls, said stop being engagable with both the flagpole and the restraining member for retention of the flagpole in a normal position generally alongside one of said walls.

10. The apparatus of claim 9, in which said release lever is pivotally mounted in an eyelet mounted to and extending through one of said walls.

11. The apparatus of claim 4, in which said flagpole is secured to said housing with a coil spring.

12. The apparatus of claim 1, in which said indicator means comprises an electric light on the outside of the housing, an electric switch inside of the housing and connected to the light, and means on the spool for operating the switch when the spool is turned.

13. The apparatus of claim 12, in which said switch is a mercury switch.

14. The apparatus of claim 13, in which said switch is suspended from a hinge behind the spool, said switch operating means being an abutment on the spool for normally holding the switch up and for dropping the switch when the spool turns.

15. The apparatus according to claim 14, including a snubber for stopping said mercury switch upon the dropping of said mercury switch.

16. The apparatus of claim 1, in which said window faces up.

17. The apparatus of claim 1, in which said housing and said door completely enclose said reel.

18. The apparatus of claim 1, in which said indicator means include a movable flag for providing a motion alert for daytime fishing, and an electric light for providing an illuminated alert for night fishing, with said reel having said actuator means for both said flag and said light.

19. The apparatus of claim 1, in which said access opening projects through both a top and a front of said housing walls, said top wall being a minority of the fore-aft depth of the housing and said front wall being a minority of the height of said housing.

20. The apparatus of claim 1, in which said actuator means is inside of said housing.

21. Fishing apparatus comprising
(a) a housing having a base, upright walls secured to the base, and an angling aperture through the base;
(b) a reel mounted to the housing, said reel having a rotatable spool with at least one rotation indicator thereon, said spool having means for storing a fishing line thereon;
(c) indicator means visible from the outside of the housing, said indicator means having a normal mode and an alternate attention mode;
(d) actuator means operatively connecting said rotation indicator to said indicator means and operative for changing said indicator means from the normal mode to the attention mode in response to rotation of the spool as fishing line is pulled off of said spool; and
(e) a transparent panel facing upward and to one side of the apparatus, said panel defining at least part of the height of one side of the apparatus, for collection of solar energy inside of the housing, and said housing being opaque.

22. The apparatus of claim 21, in which said panel defines a majority of the fore-aft depth of the apparatus.

23. The apparatus of claim 21, in which said panel is a normally closed transparent door upon said housing.

24. The apparatus of claim 21, in which said panel is at an angle within the range of 30 to 60 degrees above horizontal with respect to the base.

* * * * *